Feb. 18, 1930. C. PFERSDORF Re. 17,600

DEVICE FOR FITTING FOOTWEAR

Original Filed Dec. 8, 1925

TRANSPARENT MATERIAL

INVENTOR
Christian Pfersdorf
By his Attorney,
Nelson W. Howard

Reissued Feb. 18, 1930

Re. 17,600

UNITED STATES PATENT OFFICE

CHRISTIAN PFERSDORF, OF ELBERFELD, GERMANY, ASSIGNOR TO UNITED SHOE MACHINERY CORPORATION, OF PATERSON, NEW JERSEY, A CORPORATION OF NEW JERSEY

DEVICE FOR FITTING FOOTWEAR

Original No. 1,635,341, dated July 12, 1927, Serial No. 72,849, filed December 2, 1925, and in Germany December 5, 1924. Application for reissue filed April 30, 1928. Serial No, 274,081.

The present invention relates to a device for use in fitting shoes. With prior devices for this purpose it is impossible to determine the position of the whole foot in the shoe; they consist only of a sole which is provided with a low edge and accordingly limit themselves in essentials to determining the length of the shoe and the width of the ball of the foot.

Devices have also become known by means of which it is possible to measure up the whole shape of the foot. These devices however are intended for custom shoemakers who work to measure.

My invention differs from these devices inasmuch as I propose to keep in stock shoe-models made of transparent material in consecutive numbers. The buyer fits on one or more of these transparent shoe-models. In consequence of the transparency of the material it is possible, by this trying on, to establish the fit of the foot in a shoe having a corresponding size. The number of this transparent shoe-model corresponds with the number of the shoe to be sold and the seller can, when he has found a shoe-model that fits, take down the corresponding shoe from the shelf.

My invention is illustrated in the accompanying drawings in which.

Figure 1:
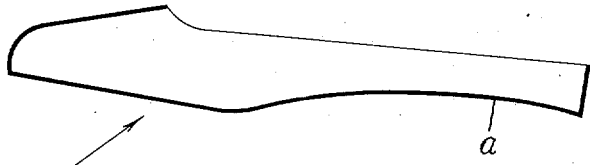
Fig. 1 is a section through a transparent shoe-model.
Figure 2:
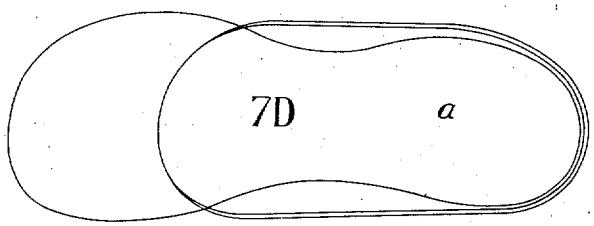
Fig. 2 is a top view thereof.

The shoe-model *a*, which has a sole and an upper provided with toe and heel portions, is made in one piece and, of course, of transparent material. Each of the shoe-models is provided with a number or symbol, as indicated at 7D in Fig. 2, corresponding to that of the shoe suitable for the foot which the shoe-model fits. Any suitable transparent material can be employed for the shoe-models but transparent celluloid is especially suitable for the purpose.

In fitting shoes with the aid of my invention, one or more of the transparent shoe-models *a* are tried upon the foot and the foot is visually inspected through the transparent material of the shoe model. Thus it is ascertained which shoe-model fits the foot. Shoes corresponding in dimensions to that shoe-model which has been found to fit the foot are then selected.

What I claim is:—

1. A device for trying on shoes or boots comprising a transparent shoe-model having an integrally formed sole or bottom and provided with a toe cap and a heel end and a number or symbol indicated on the shoe-model corresponding to the size of boots or shoes suitable for the foot upon which the shoe-model is tried.

2. A device for use in fitting boots or shoes comprising a transparent shoe-model having a sole member and an upper provided with toe and heel portions, said shoe-model bearing a symbol corresponding to the size of boots or shoes suitable for a foot which the shoe-model fits.

3. A device for use in fitting shoes comprising a shoe-model having a sole and an upper provided with a toe portion and a heel portion, the toe portion of the upper being formed of transparent material to permit visual inspection of the fit of the shoe-model on a foot in the shoe-model, said shoe- model having an easily recognizable characteristic indicating the size of shoe suitable for a foot which the shoe-model fits.

4. A shoe-model having a sole and an upper provided with a toe portion and a heel portion, said upper being formed of transparent celluloid to permit visual inspection of a foot in the shoe-model through the transparent material thereof and thereby to indicate the fit of a shoe of a size corresponding to that of the shoe-model.

In testimony whereof I have signed my name to this specification.

CHRISTIAN PFERSDORF.